United States Patent [19]

Aldereguia et al.

[11] Patent Number: 5,522,064
[45] Date of Patent: May 28, 1996

[54] DATA PROCESSING APPARATUS FOR DYNAMICALLY SETTING TIMINGS IN A DYNAMIC MEMORY SYSTEM

[75] Inventors: Alfredo Aldereguia, Boca Raton; Daryl C. Cromer, Delray Beach; Patrick M. Bland, Delray Beach; Rodger M. Stutes, Delray Beach, all of Fla.

[73] Assignee: International Business Machines Corporation, Armonk, N.Y.

[21] Appl. No.: 590,978

[22] Filed: Oct. 1, 1990

[51] Int. Cl.⁶ .............................. G06F 1/06; G06F 1/04; G06F 1/08
[52] U.S. Cl. .................... 395/550; 395/494; 365/203; 365/222; 364/DIG. 1
[58] Field of Search .................... 395/550, 425 MS; 364/200, 900; 365/203, 222 MS

[56] References Cited

U.S. PATENT DOCUMENTS

| | | | |
|---|---|---|---|
| 3,753,232 | 8/1973 | Sporer | 395/494 |
| 3,800,295 | 3/1974 | Anderson et al. | 365/222 |
| 4,014,006 | 1/1976 | Sorenson et al. | 395/550 |
| 4,366,540 | 2/1981 | Berglund et al. | 395/550 |
| 4,435,757 | 3/1984 | Pross | 395/550 |
| 4,499,536 | 2/1985 | Gemma et al. | 395/494 |
| 4,633,392 | 12/1986 | Vincent et al. | 395/284 |
| 4,660,141 | 4/1987 | Ceccon et al. | 395/829 |
| 4,809,234 | 2/1989 | Kuwashiro | 365/230.03 |
| 4,825,404 | 4/1989 | Theus | 395/284 |
| 4,899,272 | 2/1990 | Fung et al. | 365/230.03 |
| 4,926,314 | 5/1990 | Dhuey | 395/497.03 |
| 4,941,128 | 7/1990 | Wada et al. | 365/203 |
| 4,949,298 | 8/1990 | Nakanishi et al. | 395/402 |
| 4,951,248 | 8/1990 | Lynch | 395/402 |
| 4,967,397 | 10/1990 | Walck | 365/222 |
| 4,980,850 | 12/1990 | Morgan | 395/497.03 |
| 4,998,222 | 3/1991 | Sussman | 365/203 |
| 5,003,506 | 3/1991 | Itaya | 395/497.03 |
| 5,027,313 | 6/1991 | Culley | 395/497.03 |
| 5,034,917 | 7/1991 | Bland et al. | 395/494 |
| 5,042,003 | 8/1991 | Belt et al. | 395/402 |
| 5,097,437 | 3/1992 | Larson | 395/775 |

FOREIGN PATENT DOCUMENTS

| | | |
|---|---|---|
| 0386935 | 9/1990 | European Pat. Off. . |
| 2204163 | 3/1988 | United Kingdom . |

OTHER PUBLICATIONS

IBM Technical Disclosure Bulletin. "Dynamic Random Access Memory Controller State Machine". vol. 30, No. 8, Jan. 1988, pp. 96–98.

Primary Examiner—Tod R. Swann
Assistant Examiner—B. Peikari
Attorney, Agent, or Firm—George E. Grosser

[57] ABSTRACT

A data processing system includes a memory controller for accessing a dynamic memory having a plurality of SIMMs (Single In-line Memory Modules) that differ in size and speed of operation. The memory controller is operable, in response to an access request for a given SIMM, to read from a SIMM definition register and dynamically produce memory access signals in accordance with the timing requirements of the particular SIMM being accessed. Such signals are set each time a SIMM is accessed. The signals provide different clock periods of RAS precharge time, RAS (Row Address Strobe) to CAS (Column Address Strobe) time, and CAS pulse width, depending on the SIMM being accessed.

11 Claims, 12 Drawing Sheets

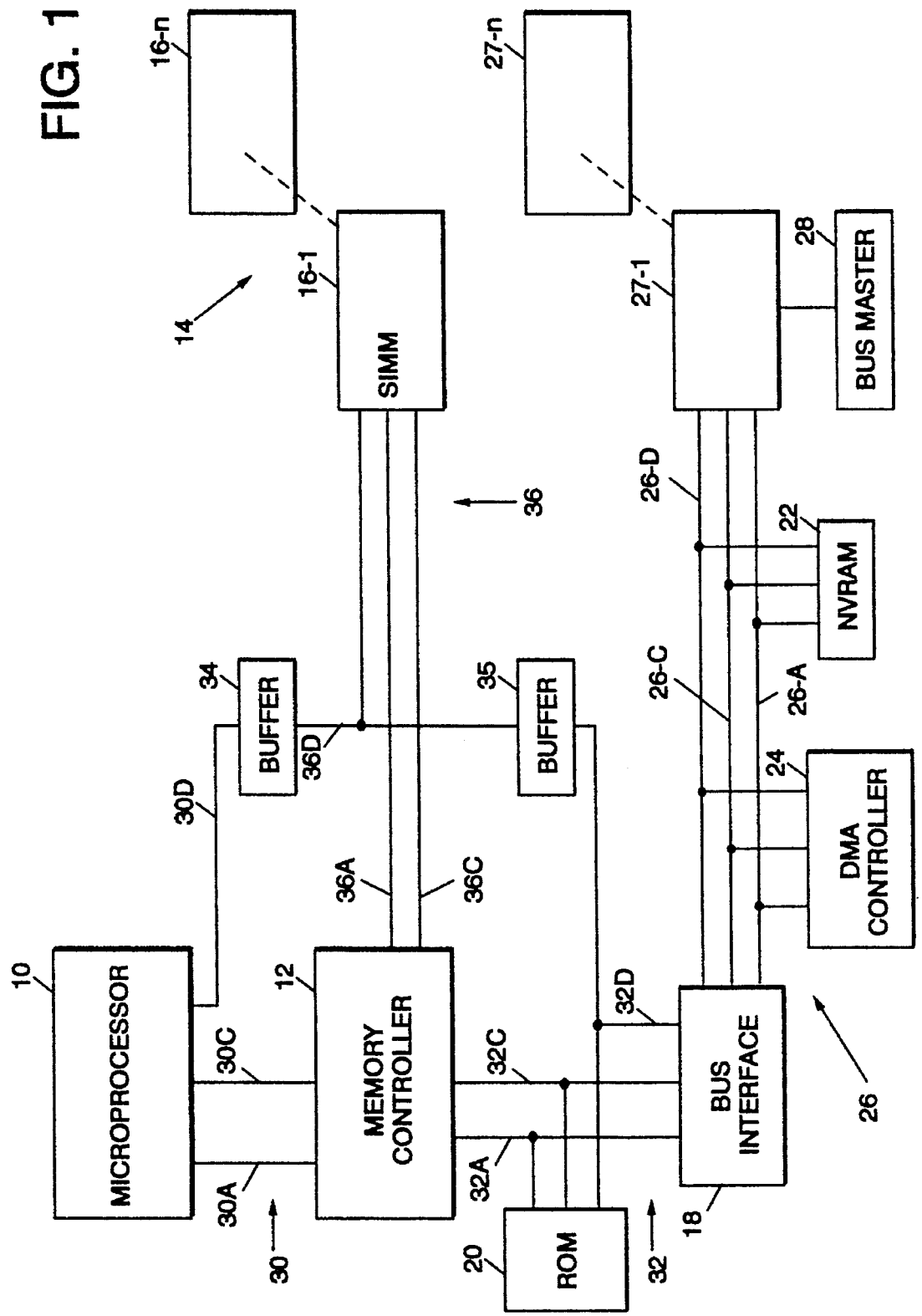

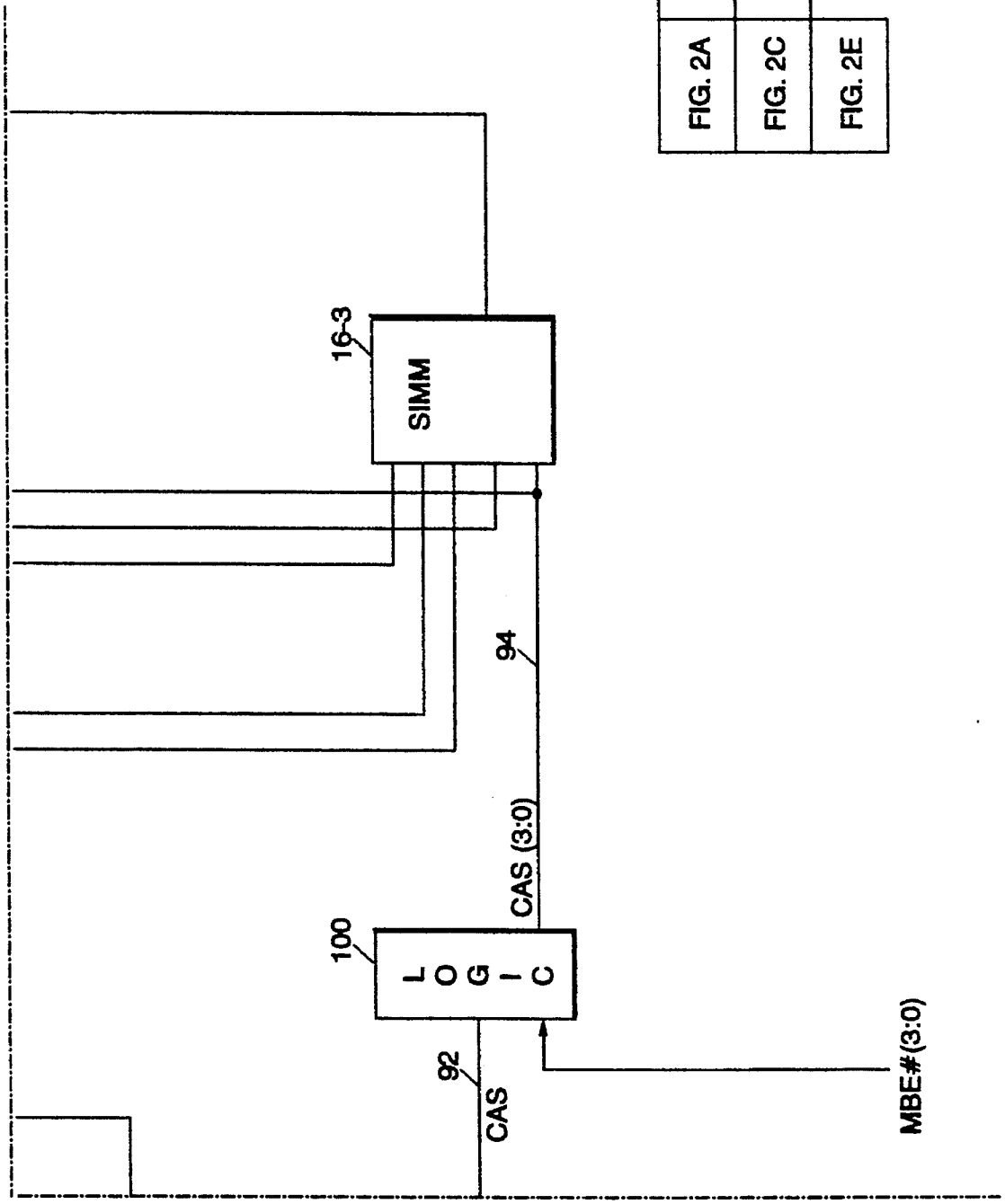

FIG. 3
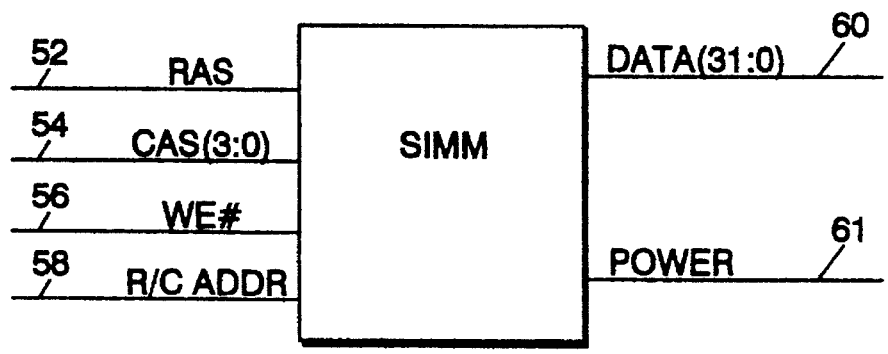
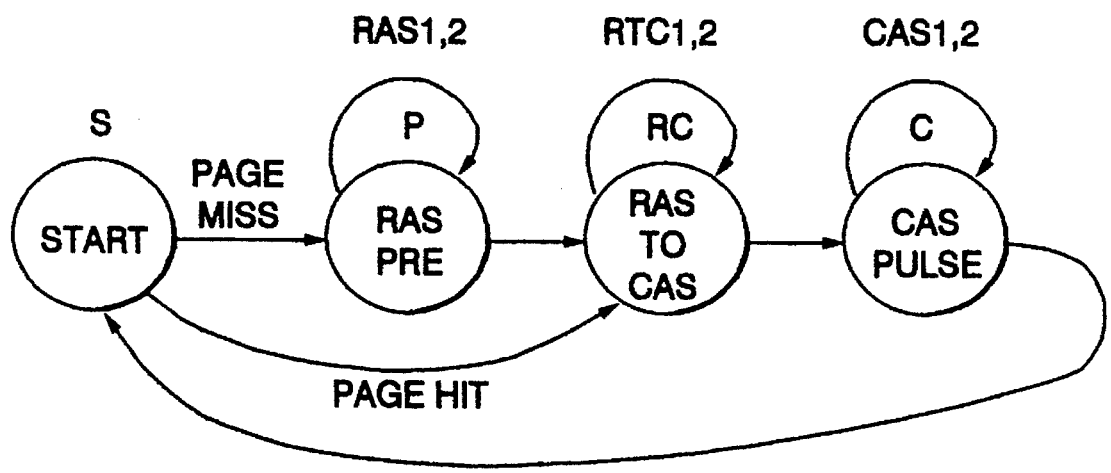
FIG. 6

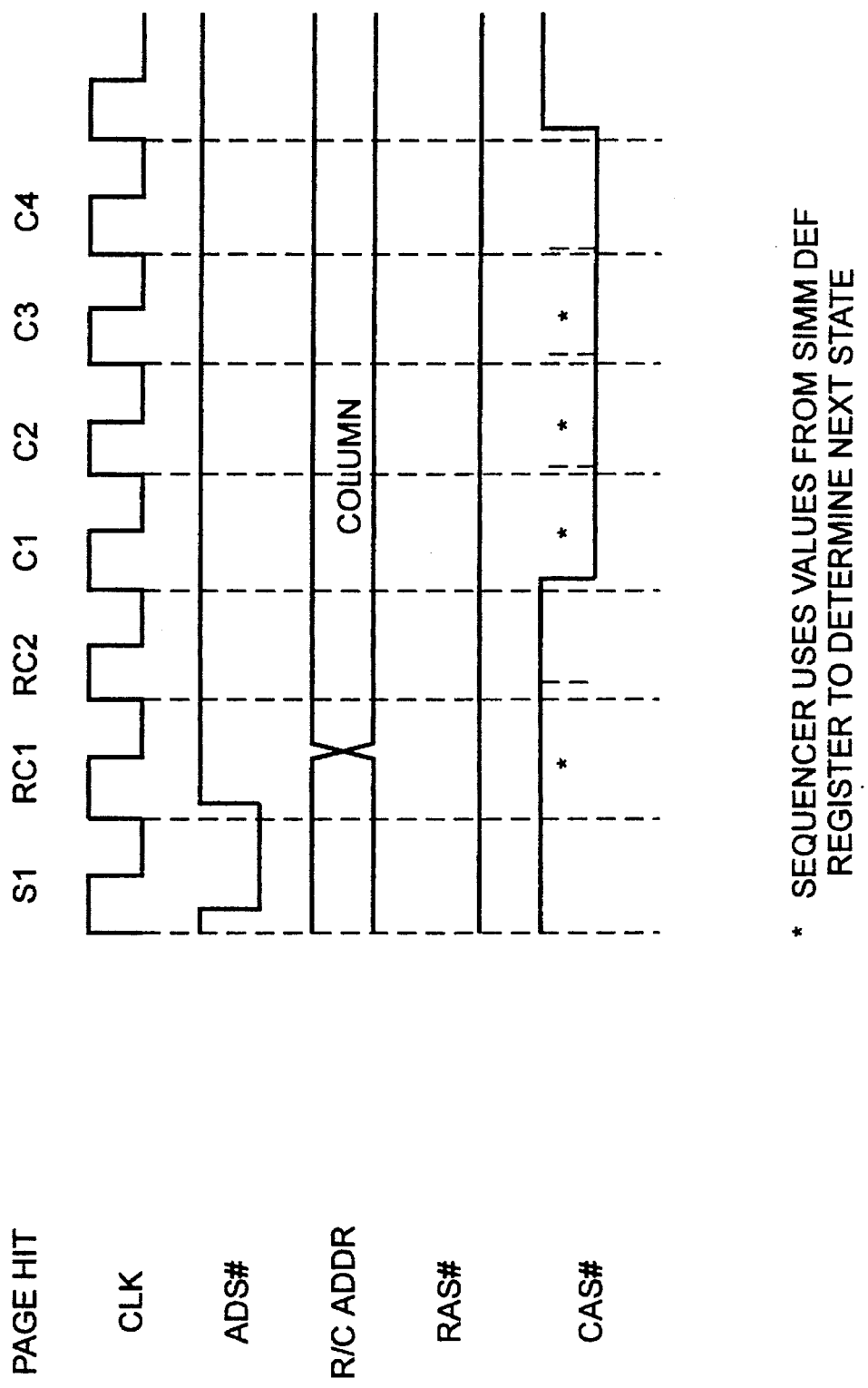

SIMM 1, @ 25MHZ

SIMM 2, @ 25MHZ

DATA PROCESSING APPARATUS FOR DYNAMICALLY SETTING TIMINGS IN A DYNAMIC MEMORY SYSTEM

FIELD OF THE INVENTION

This invention relates to the field of data processing, and, more particularly, to apparatus for dynamically setting the timings in a memory capable of using a plurality of different types of dynamic random access memory (DRAM) modules.

BACKGROUND OF THE INVENTION

Currently, data processing systems such as personal computers include a system memory having a plurality of memory modules composed of DRAM modules. A common form of such modules is a single in-line memory module (SIMM) in which a plurality of DRAM chips are integrated into a single package. Many personal computers are built with a plurality of sockets into which the SIMMs can be plugged. In many cases, the sockets are not initially filled, but as the user's needs increase, additional SIMMs are added.

Each module is characterized by many factors such as size or memory capacity, speed, memory address organization or ratio of rows to columns, etc. A memory module also requires timing or control signals to be presented thereto in precisely timed manner in accordance with the timing requirements of the module. Such timing requirements include pulse widths, transition times, hold times, precharge times, etc. Although there are many different times associated with a DRAM, the speed thereof is normally expressed by the data access time from the falling edge of RAS. A DRAM is accessed by applying different actuating signals thereto in predefined sequences dependent on the type of memory function. A typical DRAM has terminals for receiving signals such as write enable (WE#), DATA in and out, multiplexed row address and column address, row address strobe (RAS), and column address strobe (CAS).

In a data processing system, access to memory is controlled by a memory controller. Memory controllers are typically designed to support a particular type of memory and run at a particular speed determined by the system clock or speed of a microprocessor. The memory controller hardware must be designed to accommodate the timing requirements of different speed DRAMs. In addition, as the operating frequency of the memory controller is increased, the hardware must change if the timing requirements of the DRAMs have been violated.

When a given system has room for adding memory modules, such modules generally have to run at the same speed or faster than the original modules for which the associated memory controller has been designed. When faster modules are added, the system still runs at the slower design speed so that the speed of the faster modules cannot be taken advantage of.

SUMMARY OF THE INVENTION

A typical data processing system to which the invention is applicable includes a microprocessor chip, a memory having plural SIMMs, a memory controller, a direct memory access (DMA) controller, an expansion bus, and I/O devices. The microprocessor can be within a family such as the well known Intel 80386 and 80486 microprocessors, and selected to operate at one of the available speeds, such as 25 Mhz or 33 Mhz, for the 80386. The SIMM type can be from 30 ns to 100 ns using different sizes and address organizations. With such a selection of processors and SIMMs, a system designer or a user can orient a given system to a wide variety of needs and applications. The problem then becomes one of designing a memory controller to operate at different speeds to control different types of memory modules.

Thus, one of the objects of the invention is to provide method and apparatus for dynamically controlling access to a memory which can contain a plurality of memory modules differing in size, memory organization, and timing requirements.

Another object is to provide a memory controller operable at different clock speeds to control access to memory modules having different timing requirements.

Still another object is to provide a memory controller capable of emitting different timing signals to memory modules having different timing requirements.

A further object is to provide a memory controller for controlling access to a memory having a plurality of different memory modules, wherein the memory controller dynamically changes control signals emitted thereby to accommodate the different timing requirements of the memory modules.

A still further object is to provide a memory controller capable of producing timing signals of different widths, and to select the appropriate signals each time a memory module is accessed.

Another object is to provide a data processing system capable of using different memory modules operable at different speeds, and in which a memory controller can be programmed to dynamically set its timing signals in accordance with the timing requirements of the different memory modules so as to optimize system performance.

Another object is to provide a system in which memory can use different DRAMs, and a programmable memory controller stores the timing requirements of each DRAM in terms of the number of clock cycles necessary to satisfy such timing requirements, said memory controller being operable to dynamically emit timing signals in accordance with the stored information, each time a DRAM is accessed.

Briefly, the manner in which the above and other objects and advantages are achieved, is to provide a data processing system having at least a processor, a memory controller, and a memory containing a plurality of memory modules. A programmable storage contains information defining the timing requirements of the modules. Each time a module is accessed, the information in such storage is used to dynamically set the memory controller to emit control signals in accordance with the timing requirements of the particular module being accessed.

DRAWINGS

Other objects and advantages of the invention will be apparent from the following description taken in connection with the accompanying drawings wherein:

FIG. 1 is a block diagram of a data processing system embodying the invention;

FIGS. 2, 2A, 2B and 2C form a block diagram of a portion of the memory controller shown in FIG. 1;

FIG. 3 is a schematic diagram of a SIMM type memory module used in the memory shown in FIG. 1;

FIG. 6 is a state diagram of a portion of the memory controller useful in understanding how the control signals in FIG. 5 are produced.

DETAILED DESCRIPTION

Figure 2A:
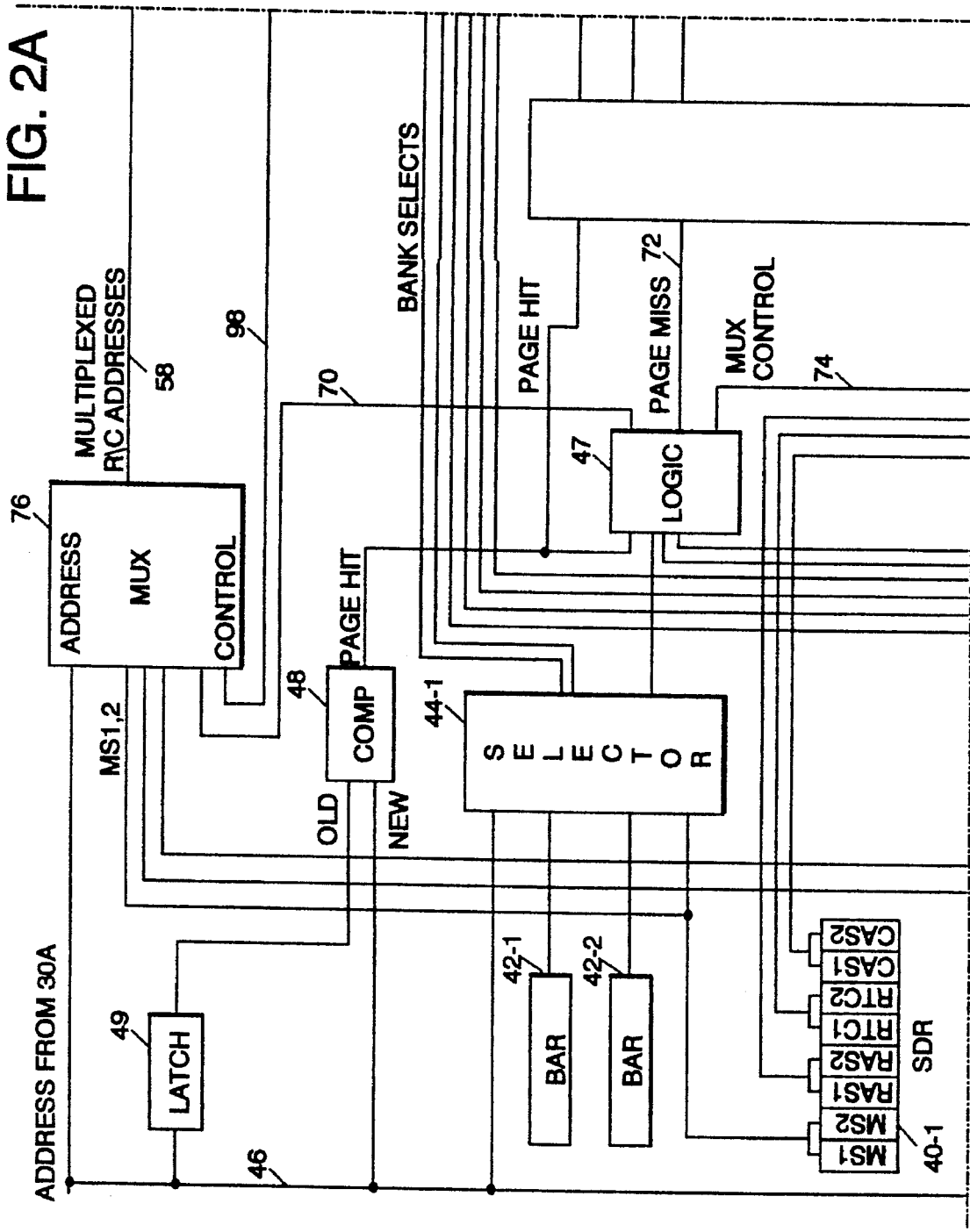
Figure 2B:
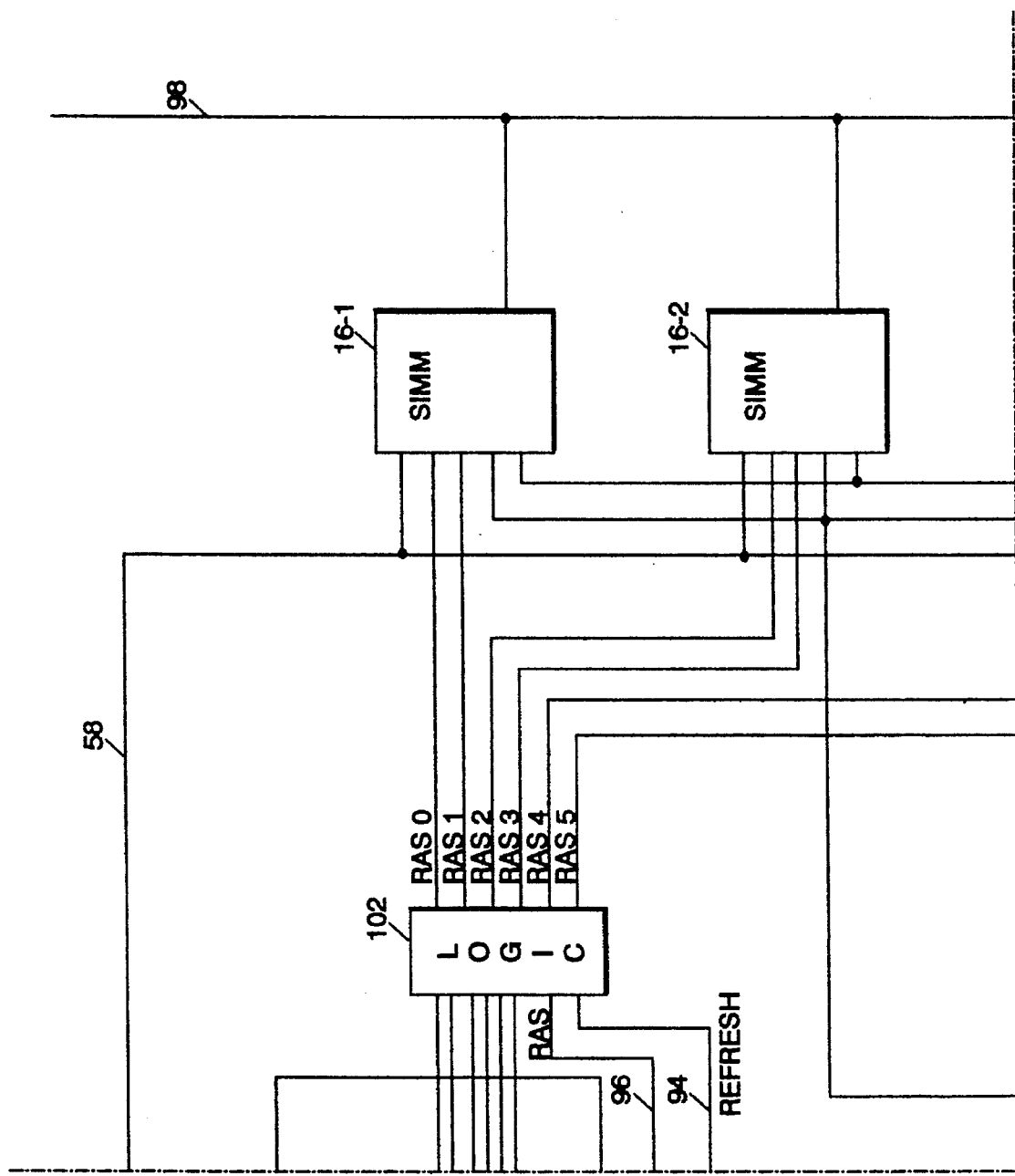
Figure 2C:
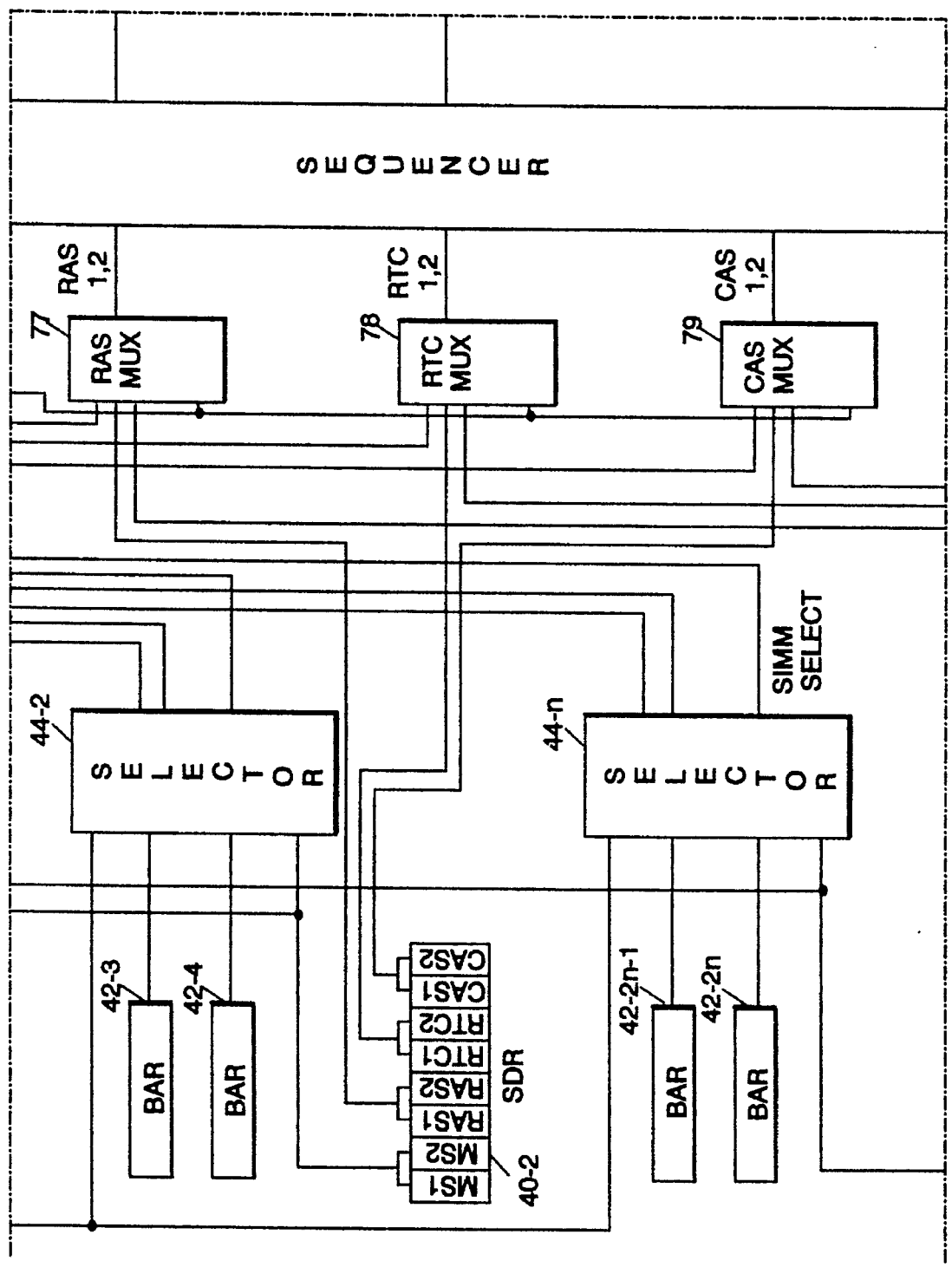
Figure 2E:
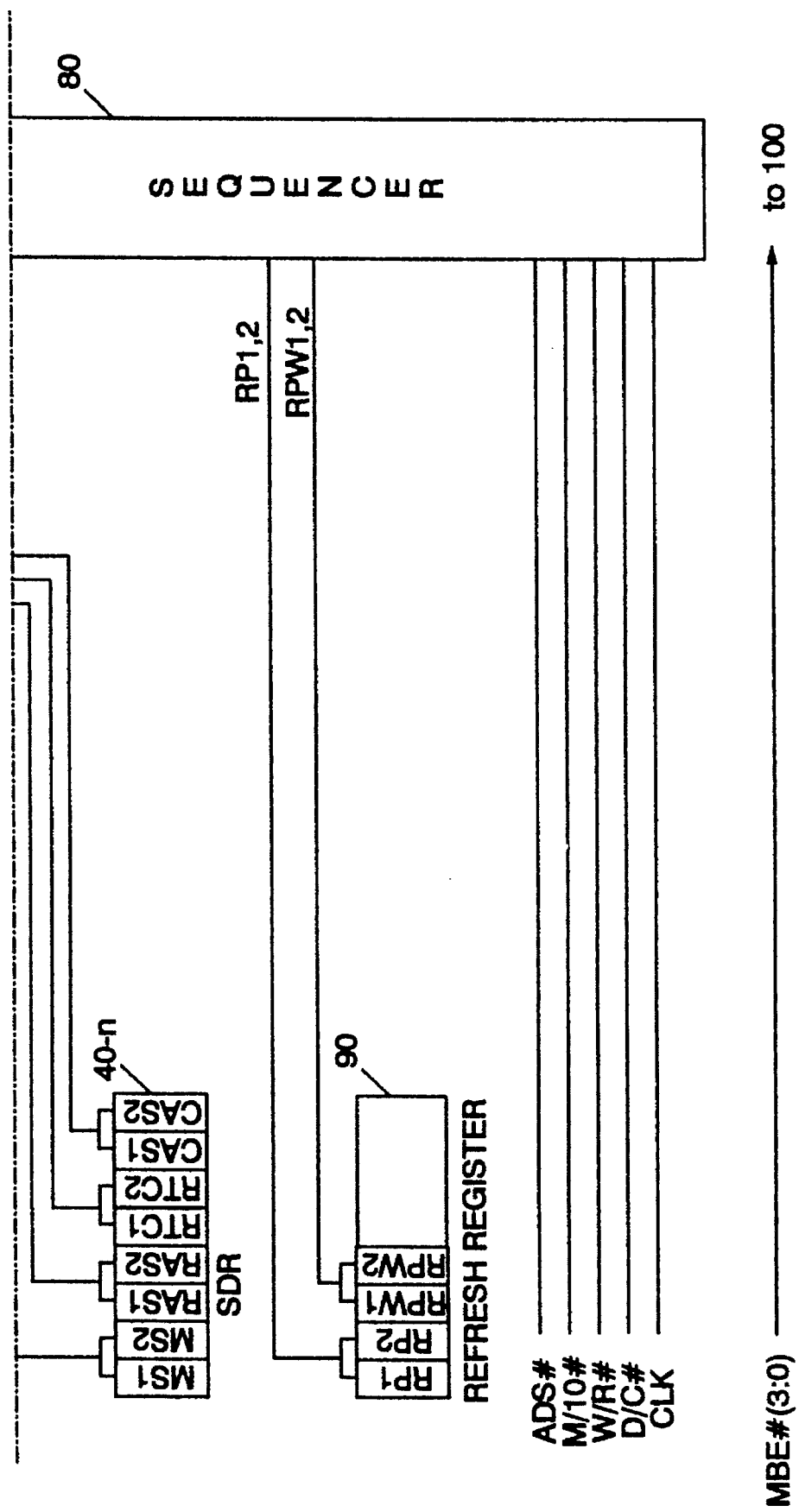

Referring now to the drawings and first to FIG. 1, the data processing system shown therein includes a microprocessor 10, a memory controller 12, a memory 14 having a plurality of SIMMs 16-1 through 16-n, a bus interface 18, a read only memory (ROM) 20 for storing a basic input/output operating system (BIOS), a non-volatile RAM (NVRAM) 22 for storing setup and configuration information, a direct memory access (DMA) controller 24, an expansion bus 26 connected to a plurality of expansion sockets 27-1 through 27-n, and a busmaster 28 connected to expansion socket 27-1. Controller 12 is a dual port controller connected to a CPU bus 30 and a system bus 32. A data bus 30D is connected between microprocessor 10 and a buffer 34, and a data bus 32D is connected between bus interface 18 and a buffer 35. Buffers 34 and 35 are connected to memory 14 by the data bus 36D of a memory bus 36. It should be noted that the address, control, and data busses of busses 26, 30, 32 and 36 are referenced using the respective suffixes A, C, and D.

Except for certain details of controller 12 and operation as described below, the system is constructed in accordance with known principles and uses well documented, commercially available devices so that further details thereof not necessary to an understanding of the invention are omitted herefrom. It is to be understood that the many support and other devices commonly included in a data processing system have been omitted for simplicity of illustration.

Within the system as described thus far, memory 14 can be accessed by microprocessor 10, DMA controller 24, or bus master 28. Since such memory accessing is similar for each such device, the following description will be limited to illustrating how microprocessor 10 accesses memory 14. It is apparent to those skilled in the art how other devices can similarly access the memory. Furthermore, it is recognized there are many different memory configurations but for the purpose of illustrating the invention, memory 14 is assumed to have a maximum capacity of eight, 32-bit wide SIMMs, each SIMM having one or two banks, each bank having a capacity of 1 or 4 Mbytes, and operable at RAS speeds of 30–100 ns.

Figure 4:
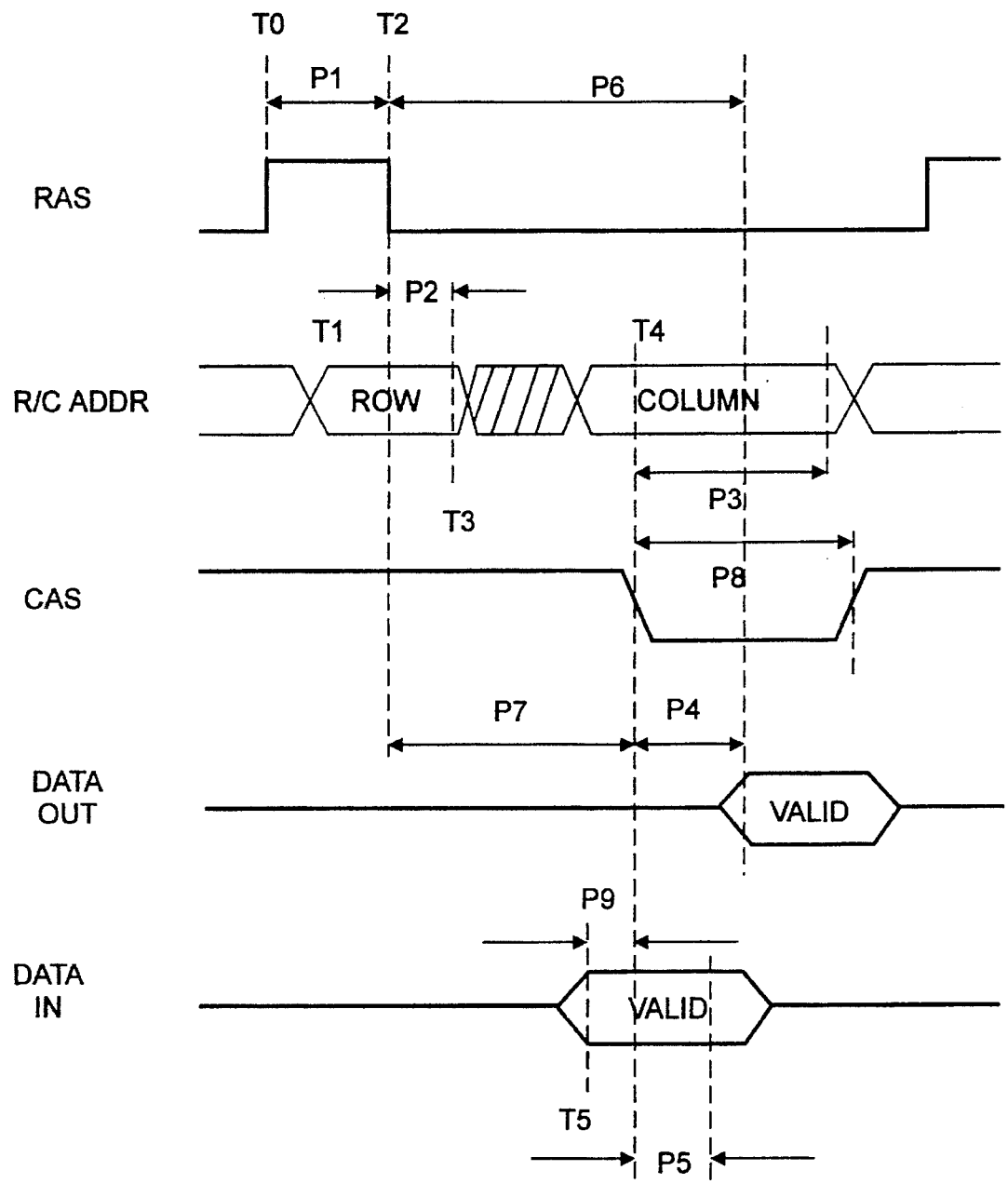
FIG. 4 is a timing diagram illustrating the operation of the module shown in FIG. 3.

Before proceeding with further description of the invention, it is felt that a review of the general operation of an exemplary SIMM would be useful. With reference to FIGS. 3 and 4, a SIMM has a plurality of input lines including a line 52 for receiving a row address strobe (RAS) signal, four lines 54 for receiving column address strobe (CAS) signals (CAS 3:0), a line 56 for receiving a write enable (WE#) signal, and a plurality of lines 58 for receiving multiplexed row address and column address signals. A plurality of lines 60 serve as both input and output lines for transmitting data into and out of the SIMM. Power lines 61 supply power to operate the SIMM.

The operation of a SIMM is cyclic. At the beginning a cycle, the WE# signal is set to either a read operation or a write operation. A RAS signal is applied at time T0 to initiate the SIMM cycle whereby the SIMM internally precharges the row address, the signal continuing for a period P1 which defines the RAS precharge time. At time T1, the row address signals become valid and thereafter at time T2, RAS drops to define a strobe indicating to the SIMM that the row address is valid. The row address is held valid for a period P2 after which a transition from the row address to the column address begins, the transition time depending on how fast MUX 76 can switch from valid row address signals to valid column address signals. Each CAS signal falls or strobes at time T4 after which the column address line is held valid for a period P3 allowing such address to be used in the SIMM. During a read access, after a lapse of a period P4 from when the CAS strobe occurred, the data from SIMM is outputted as valid data. During a write operation, data being written into the SIMM has to be valid at a time T5 to provide a data setup period P9 immediately preceding the CAS strobe at T4. Data in should be held valid for a period P5 allowing the data to be read into the SIMM. RAS is held down for at least period P6 which is the RAS access of the SIMM. For example, in a 70 ns SIMM, period P6, which is known as the RAS access, is 70 ns. The period P7, between the falling edge of RAS and the falling edge of CAS, is known as the RAS to CAS timing.

While there are many timing requirements associated with a given SIMM, the three signals covering periods P1, P7, and P8 respectively defining the RAS precharge time, RAS to CAS time, and CAS pulse width, are of importance to the invention for the following reasons. The timing requirements of a given SIMM specify the minimum periods which must be followed in order for the SIMM to operate properly. Timing and control signals are supplied by memory controller 12 which operates at the speed of the system clock. Memory controller 12 creates the signals to operate the memory modules in proportion to the system speed, so as to achieve or satisfy at least the minimum timing requirements of the memory modules. More specifically, controller 12 will use the clock cycles supplied by the system clock to create signals for operating the SIMM, the created signals being integral(s) of the clock periods to satisfy the minimum timing requirements for such SIMM. Obviously, such created signals may be longer than the minimum requirements but they should never be shorter. By setting the RAS precharge time, the RAS to CAS time, and the CAS pulse width in accordance with an appropriate number of clock cycles, the majority of timing requirements of different SIMMs can be readily met.

Microprocessor 10 is preferably an 80386 microprocessor operable at a speed of 16 Mhz, 20 Mhz, 25 Mhz, or 33 Mhz or an 80486 microprocessor operable at a speed of 25 Mhz or 33 Mhz. Memory controller 12 is designed to work across a range of frequencies including the speed at which a given microprocessor 10 operates. The frequency of operation of a system clock (not shown) controls the memory controller and determines the length or period of each clock pulse. As noted above, SIMMs 16 can have different timings, and controller 12 is programmed to provide signals having the appropriate pulse widths measured in clock pulses to operate the SIMMs. When the basic frequency of operation is changed, such as by upgrading the microprocessor for faster operation, the programmed timings can be changed to compensate for the change in clock pulse width.

Referring to FIG. 2, memory controller 12 comprises a plurality of SIMM definition registers (SDR) 40-1 through 40-n, there being one register for each SIMM in the system. Each SDR 40 is an eight bit register for storing the following information:

Bits MS1,2- SIMM or memory size and RAS and CAS address organization, i.e., the number of column address bits and row address bits;

00=8×10
01=9×9
10=10×10
11=reserved

Bits CAS1,2- CAS pulse width, i.e., number of clock pulses or clocks in which CAS is held active;

00=1 clock
01=2 clocks
10=3 clocks
11=4 clocks

Bits RTC1,2- RAS to CAS, i.e, number of clocks from the falling edge of RAS to the falling edge of CAS during a page miss, or number of clocks from beginning of cycle to falling edge of CAS during a page hit cycle;

00=0 clock
01=1 clock
10=2 clocks
11=reserved

Bits RAS1,2- RAS precharge, i.e., number of clocks in which RAS is held inactive for a page miss;

00=1 clock
01=2 clocks
10=3 clocks
11=4 clocks

Controller 12 also includes a plurality of base address registers (BARs) 42-1 through 42-2n, there being one such register for each memory bank in the associated SIMM. Since each SIMM could have two banks, there are two BARs for each respective SIMM. Each BAR 42 is an eight bit register for storing the base or starting address of the corresponding bank.

Controller 12 also includes a plurality of SIMM select circuits 44-1 through 44-n, there being one circuit 44 for each SIMM. An address bus 46 is connected to receive addresses from CPU bus 30A and transmit such addresses to circuits 44. Such circuits also are connected to receive the base addresses from the associated BAR 42 and the SIMM size bits MS1,2 from the associated SDR 40. In response thereto, each circuit 44 determines if the address corresponds to the range of the corresponding SIMM, and if it does, then such circuit 44 outputs a SIMM Select signal to a logic circuit 47. If the address is not within such range, no such signal is generated. When memory 14 is accessed, one SIMM Select signal is active.

A latch 49 is connected to bus 46 and to comparator 48. Latch 49 stores therein the address of the last access and comparator 48 compares such old address with the new address to see if both reference the same page. After the comparison is made, the new address is stored in latch 49 as the old address. The output of comparator 48 is a signal indicating that a page hit cycle will occur. A page is defined as the number of bytes accessed with a given row address. Thus comparator 48 determines whether the row addresses of the old and new addresses are the same.

Logic 47 receives inputs from each of circuits 44 and from page hit comparator 48. Logic 47 produces three outputs on lines 70, 72, and 74. Controller 12 further includes an address multiplexer (MUX) 76, a plurality of n-to-1 MUXs 77–79, and a sequencer 80 which are respectively connected to lines 70, 74, and 72 to receive the output signals from logic 47. MUX 77 is connected to each of the SDRs and receives therefrom RAS1,2 signals. MUX 78 is connected to each SDR and receives RTC1,2 signals. MUX 79 is connected to each SDR and receives therefrom CAS1,2 signals. MUXs 77–79 also have a control input connected to line 74 and the MUX control output from logic 47.

When any one of the outputs from SIMM select circuits 44 becomes active, logic 47 will produce output signals as follows. First, an output will be made on 74 to gate the MUXes to pass the RAS1,2, RTC1,2, and CAS1,2 signals from the SDR associated with the selected SIMM, to sequencer 80. The sequencer contains three counters (not shown) for receiving such signals and generating the RAS precharge, the RAS to CAS and the CAS pulse widths in accordance with the clocks specified in RAS1,2, RTC1,2 and CAS1,2. Second, an output Page Miss signal will be active on line 72 and inputted to sequencer 80 to act as an enable or go signal to proceed with accessing memory 14 using a page miss cycle. Third, control signals are placed on line 70 indicating on a page miss which SIMM is selected enabling MUX 76 to multiplex row and column address signals in accordance with the memory organization bits MS1,2 of the selected SIMM and with the type of memory cycle. MUX 76 extracts from the address on bus 46 the appropriate number of row address bits and column address bits which number is determined by the information stored in the selected SDR 40.

Controller 12 further includes a refresh register 90 which stores four bits for controlling the refresh timing. The bits are RP1,2, for controlling the refresh precharge width, and RPW1,2 for controlling the refresh pulse width. Refresh requests are controlled by the DMA. The four bits are set for the worse case requirement of the SIMMs, so as to satisfy all the SIMMs. This reduces the complexity of the system and does not degrade system performance because of the relative infrequency of refresh.

The memory controller registers SDRs 40, BARs 42, and refresh register 90 are accessible as I/O ports and may be programmed in the following manner. When the data processing system is setup and configured, the information is read from the setup disk and/or entered by a user and is stored in the non-volatile CMOS RAM 22. Subsequently, when the system is powered on, the BIOS in ROM 18 copies the information into the registers in memory controller 12.

Controller 12 is connected to control bus 30C to receive the following accessing signals: ADS#, M/IO# W/R#, D/C# and CLK. Such signals are inputted into sequencer 80. A signal MBE#(3:0) from bus 30A is inputted into logic 100. Such signals are provided in accordance with the conventional operation of microprocessor 10, to control the memory accessing, in the manner described below. Controller 80 is connected to output lines 92, 94, 96, and 98 which respectively are connected to logic 100, logic 102, logic 102, and MUX 76. The output CAS on line 92 in conjunction with the memory byte enable signals MBE#(3:0) causes logic 100 to apply the appropriate CAS select signal to a SIMM on line 54. The output signals on lines 94 and 96 control the RAS select signals on line 52 for each SIMM. The output signals on line 98 are timing signals which tell MUX 76 when to transmit the RAS and CAS addresses.

Figure 5A:
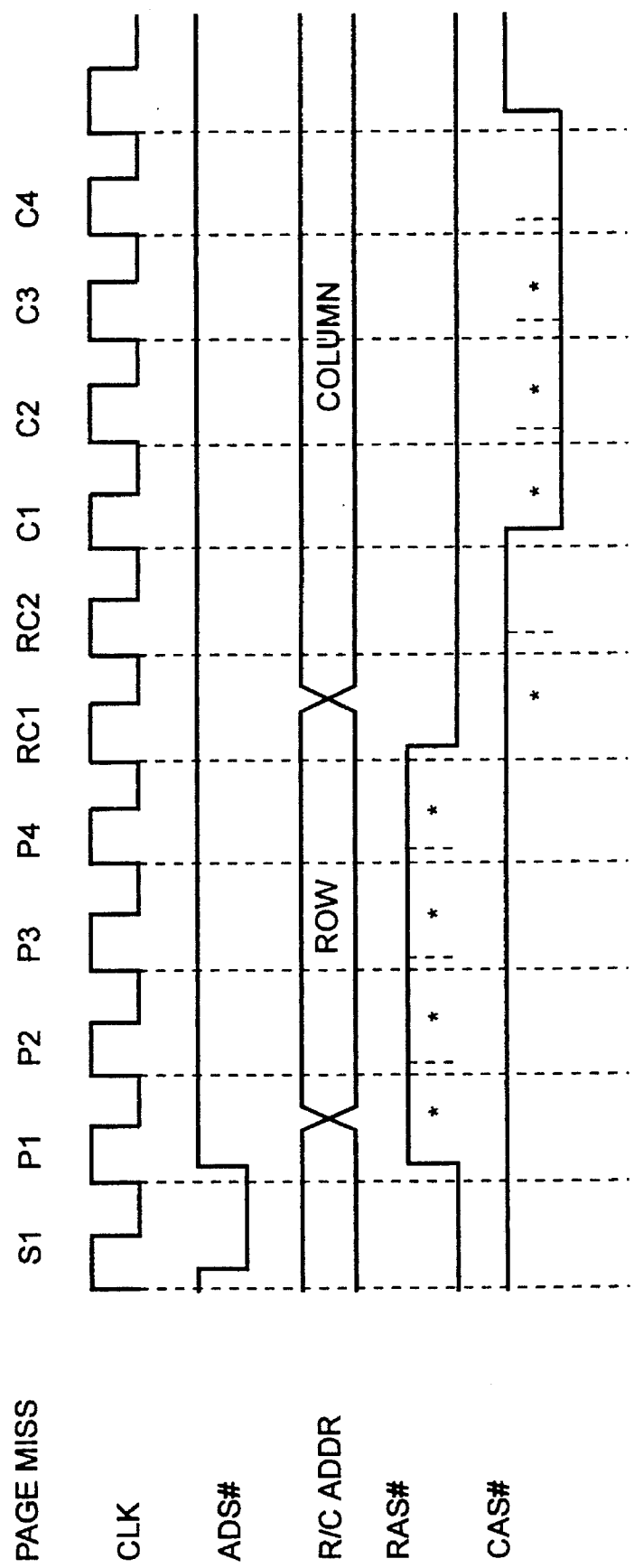
FIG. 5 is a timing diagram showing page hit and page miss cycles and various possible pulse widths.
Figure 7A:
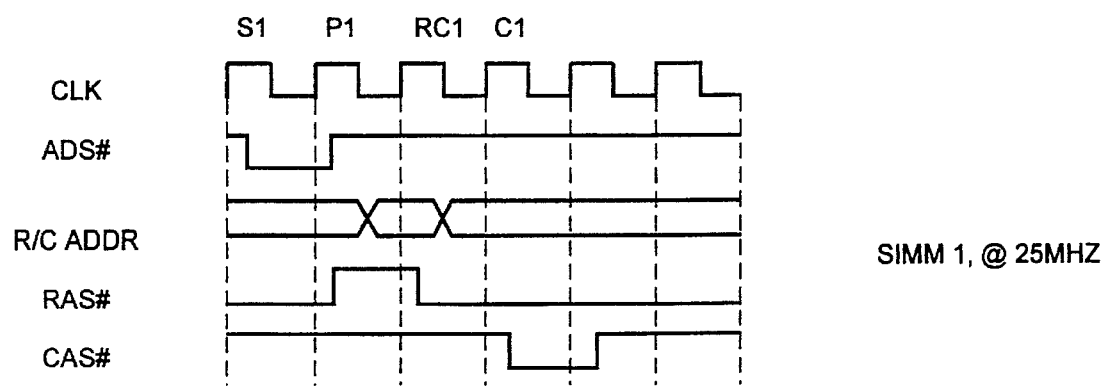
FIG. 7 is a timing diagram showing examples of timing requirements for different illustrative conditions.
Figure 7B:
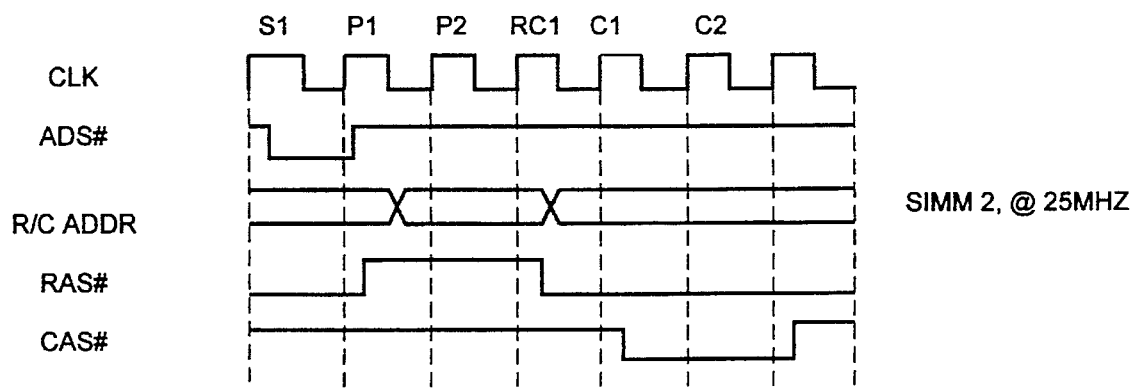
Figure 7C:
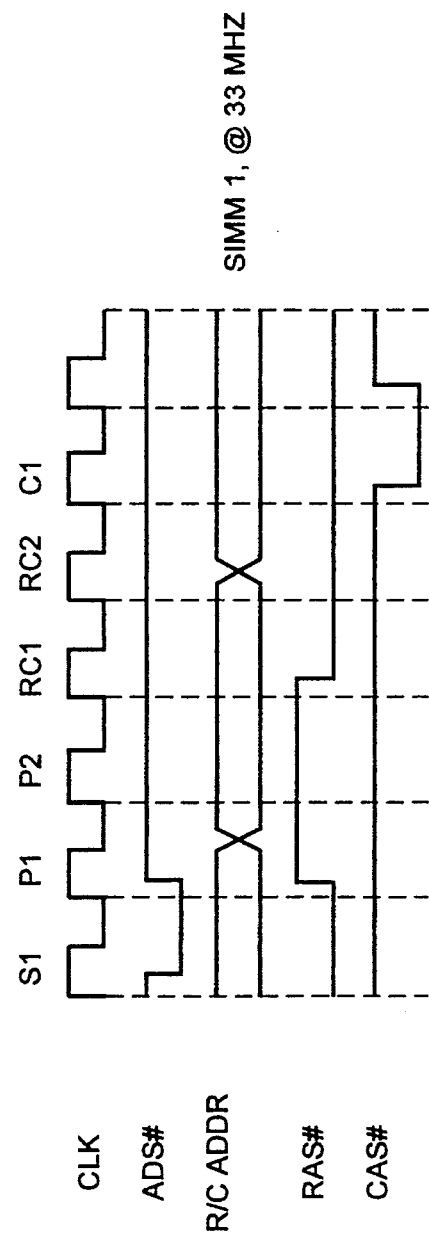
Figure 7D:
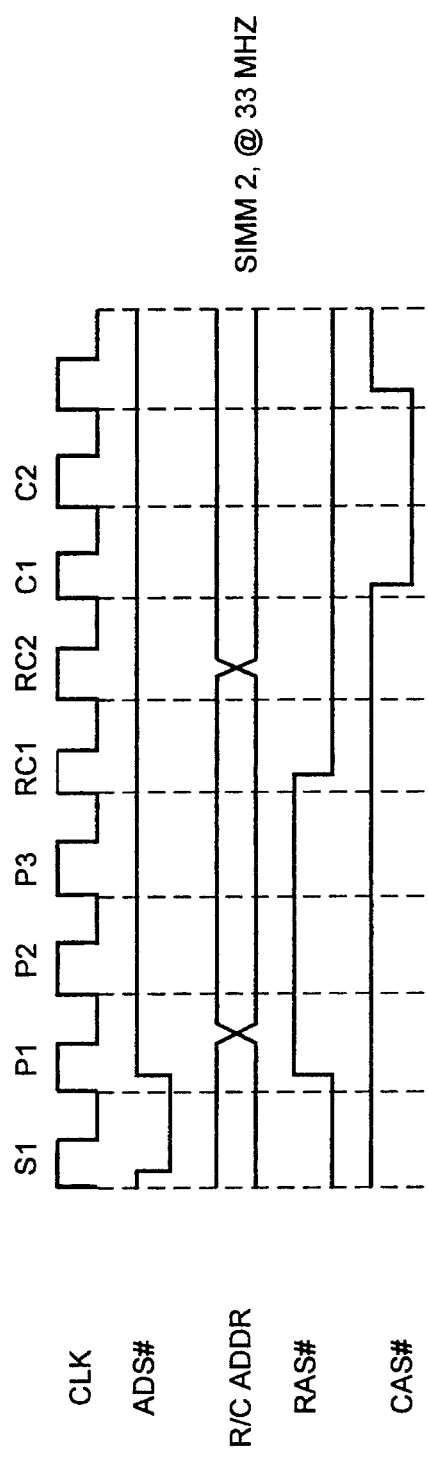

Further details of the apparatus and the method of the invention will be apparent from the following description of the operation relative to the state and timing diagrams. With reference to FIG. 5, diagram A shows some of the timing signals that occur during a page miss cycle, and diagrams B shows the corresponding signals during a page hit cycle. A page miss cycle precedes one or more page hit cycles. It is to be understood that signals other than those shown in such diagrams occur which have been omitted for simplicity of illustration and since they operate in convention manner, such signals including the WE#, M/IO, D/C and MBE#(3:0)

from the processor. The CLK signal proceeds at the speed of operation of the controller and the microprocessor and is the basic timing signal for controlling the other signals.

A memory access cycle is divided by sequencer 80 into four states or phases: a start phase S, a RAS precharge phase P, a RAS to CAS phase RC, and a CAS pulse phase C. Such phases are shown in the state diagram of FIG. 6, and the corresponding periods in the timing diagrams in FIG. 5 are indicated using the same reference letter along with a suffix numeral indicating the corresponding number of clock period in each phase. For example, RC2 represents the second clock in the RAS to CAS phase.

Referring to FIG. 5, a determination is made during the start phase S whether the access cycle will be a page miss or a page hit cycle, and dependent upon such determination, control passes either to phase P for a page miss cycle, or to phase RC for a page hit cycle. During a page miss cycle, a determination is made in period P1 whether another P period is needed, in accordance with the number of clock periods determined by bits RAS1,2 for the SIMM being accessed. That is, such bits determine how many clock periods will occur during the P phase. Similarly, bits RTC1,2 and bits CAS1,2 respectively define the number of clock periods in the RC and C phases.

Referring to FIG. 5, a cycle begins when the ADS signal goes low during S1 and the conjunction of such low signal and the subsequent rising of CLK initiates entry into the next phase. During a page miss cycle, the next phase is P during which the row addresses are gated to the SIMM along with the RAS. In the example, the P phase is four periods. This is followed by two periods of phase RC. During the first period RC1, RAS goes inactive and the column address is gated to the SIMM. Upon completion of two periods, the C phase occurs for four periods. During C1, the falling CAS signal strobes the column address into the SIMM. During a page hit, similar signals are used except the P phase is skipped since the SIMM is already precharged due to a prior page miss cycle to the same row address.

During state S1, the SDRs are not analyzed. The reason for this is that the only decision that need be made during S1 is whether a page hit or a page miss has occurred, and that is decided by comparator 48 on the basis of the row address. Also during S1, the memory address is analyzed and the appropriate SIMM Select line is activated. Logic 47 emits MUX Control signals on lines 74 to gate the appropriate signals from the SDR of the selected SIMM into sequencer 80. Also, the PAGE HIT or PAGE MISS signal into sequencer 80 is driven appropriately.

During P1, which state is entered for a page miss cycle, the RAS precharge (RAS1,2) signals are loaded into a counter (not shown) in sequencer 80 which generates the RAS precharge pulse width in accordance with the number of clocks specified. During a page miss cycle, there is always at least one clock RAS precharge time, and therefore, by dynamically selecting the appropriate SDR in the prior state, and analyzing the signals therefrom in the P1 state, there is no performance degradation.

During a page hit cycle, the same events occur during S1 as indicated above except that by determining a page hit cycle is occurring, the controller branches from the S1 state to the RC1 state. The values of RC1,2 loaded into sequencer 80 during S1 are used to generate the appropriate RAS to CAS time during RC1. Since RC1 always occurs in order to setup column addresses correctly, there will be no performance degradation for reasons similar to those set forth in the preceding paragraph.

FIG. 7 illustrate timing diagram examples of how two different SIMMs would be programmed to first operate in a 25 Mhz system, and then in a 33 Mhz system. The illustrations are for a page miss cycle. The memory SIMM specifications are:

|  | SIMM1 | SIMM2 |
|---|---|---|
| RAS ACCESS | 30 ns | 80 ns |
| RAS PRECHARGE | 30 ns | 70 ns |
| CAS ACCESS | 14 ns | 35 ns |

The system specifications are:

| Column address valid from RAS active | 35 ns |
|---|---|
| Read data setup time | 10 ns |
| Clock period 25 Mhz | 40 ns |
| Clock period 33 Mhz | 30 ns |

The diagrams are for the following examples:

| Diagram | SIMM | Speed | P | RC | C |
|---|---|---|---|---|---|
| 7a | SIMM1 | 25 Mhz | 1 | 1 | 1 |
| 7b | SIMM2 | 25 Mhz | 2 | 1 | 2 |
| 7c | SIMM1 | 33 Mhz | 2 | 2 | 1 |
| 7d | SIMM2 | 33 Mhz | 3 | 2 | 2 |

The values under P, RC, and C represent the number of clock periods of the respective phases necessary to meet the timing requirements for SIMMs 1 and 2. Such values would be programmed into the associated SDRs in accordance with the bit settings noted with reference to the descriptions of SDRs 40. Each of the examples is arrived at in a similar manner, so only one need be described in detail. Using the example for diagram 7a, SIMM1 requires a 30 ns precharge time (P1 in FIG. 4). Since the clock period is 40 ns, only one clock period is required for the P phase. The RC settings must meet the row address hold time P2, the transition time for switching from row to column addresses, and the column address setup time. The C or CAS pulse width time should meet the minimum CAS pulse width time as set forth in the timing requirement of the specific SIMM specification during a write cycle. During a read cycle, the C time must meet the CAS access and data setup time allowing for propagation delay and hold time in a device data latch. Quite obviously, it is within the skill of the art to set the times in accordance with the timing requirements of any given SIMM.

These examples illustrate several advantages of the invention. First, different speed SIMMs can be used with the same microprocessor in the same system. Each time an access is made to a different SIMM, the memory controller uses programmed settings to operate the controller and provide the appropriate timings. Second, if the microprocessor speed is changed, the same SIMMs can be used by changing the programmed settings to satisfy the changed system speed.

It should be apparent to those skilled in the art that many changes can be made in the details and arrangements of steps and parts without departing from the scope of the invention as defined in the appended claims.

What is claimed is:

1. A data processing system comprising:
   a dynamic read/write memory including a plurality of memory modules each having a plurality of addressable storage locations;
   a single memory controller for controlling operation of all of said memory modules;
   a processor for initiating memory access cycles to read data from said memory and write data into said memory, said processor being operable to selectively produce accessing signals including cycle definition and address signals to start a memory access cycle;

and bus means interconnecting said processor, said memory, and said memory controller to transfer data and accessing signals therebetween;

each memory module being accessible in response to receiving module operating signals including read/write, row address, column address, row address strobe (RAS), and column address strobe (CAS) signals;

said memory controller being operable to transmit said module operating signals to a memory module, in response to receiving accessing signals from said processor, said memory controller comprising timing means including a clock input line for receiving system clock signals and operating said memory controller at the speed of said system clock signals;

a plurality of programmable definition registers each associated with a different one of said memory modules, each definition register being operative to store pulse control signals specific to the timing requirements of the associated memory module, said pulse control signals in each definition register specifying said timing requirements as integral numbers of said clock periods, a sequencer connected to said memory modules for generating said module operating signals;

and means, responsive to said address signals, for gating said pulse control signals from the definition register associated with the memory module being addressed, to said sequencer, said sequencer being operative to set the timing of said module operating signals in accordance with the timing requirements specified by said pulse control signals.

2. A data processing system in accordance with claim 1 wherein:

a first memory module is accessible in accordance with a first set of timing requirements:

a second memory module is accessible in accordance with a second set of timing requirements different than said first set;

and said definition registers associated with said first memory module and with said second memory module are respectively programmed to provide pulse control signals meeting the respective minimum timing requirements of both of said first and second sets for said first and second memory modules.

3. A data processing system in accordance with claim 1 wherein:

said pulse control signals determine RAS precharge time, RAS to CAS time, and CAS pulse width during memory access cycles.

4. A data processing system in accordance with claim 3 wherein:

said sequencer is operable, in response to said controller receiving said accessing signals from said processor, to sequence through a series of states including a start state, a RAS precharge state, a RAS to CAS state, and a CAS state, during which states said module operating signals are transmitted to the memory module being addressed.

5. A data processing system in accordance with claim 4 wherein:

said controller comprises means, responsive to the receipt of said accessing signals, for controlling said sequencer to cycle through a page miss cycle or a page hit cycle, said page miss cycle being a series of all of said states, said page hit cycle being a series of all of said states except for said RAS precharge state.

6. A data processing system in accordance with claim 5 wherein:

said address signals include a row address, and said controller comprises a comparator for storing an old row address of a row accessed in a preceding memory access, said comparator including an input for receiving a new row address of a storage location to be accessed, and comparing said new address to said old address and outputting a page hit control signal in response to such comparison.

7. A data processing system in accordance with claim 6 wherein:

said page hit control signal is produced during said start state and causes entry into said RAS precharge state for a page miss cycle and into said RAS to CAS state for a page hit cycle.

8. A data processing system in accordance with claim 6 wherein:

said pulse control signals are read into said sequencer during said RAS precharge state when cycling through a page miss cycle and during said RAS to CAS state when cycling through a page hit cycle.

9. A data processing system in accordance with claim 8, wherein:

said pulse control signals determine the lengths of said RAS precharge state, said RAS to CAS state, and said CAS state.

10. A data processing system according to claim 1 further comprising:

a non-volatile storage device for storing said pulse control signals;

and means operative, in response to said data processing system being powered on, to copy said pulse control signals from said non-volatile storage device into said pulse definition registers and thereby program said registers.

11. A data processing system in accordance with claim 10 further comprising:

a plurality of sockets for connecting a like plurality of memory modules, wherein said memory modules are a mix of different capacity modules having different timing requirements and different row/column configurations;

a plurality of base address registers for storing base addresses of each memory module;

and each definition register further storing information defining the row/column configuration of the associated memory module, said information being used by said sequencer to generate said row address and said column address signals for accessing said associated memory module.

* * * * *